United States Patent
Kulkarni et al.

(10) Patent No.: US 12,028,769 B2
(45) Date of Patent: *Jul. 2, 2024

(54) mmWAVE TO WI-FI CONTROL SIGNAL OFFLOADING IN THE EVENT OF FADING IN THE mmWAVE SYSTEM

(71) Applicant: T-Mobile Innovations LLC, Overland Park, KS (US)

(72) Inventors: Atul Kulkarni, Brambleton, VA (US); Sreekar Marupaduga, Overland Park, KS (US); Anurag Thantharate, Overland Park, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/301,879

(22) Filed: Apr. 17, 2023

(65) Prior Publication Data

US 2023/0254747 A1 Aug. 10, 2023

Related U.S. Application Data

(63) Continuation of application No. 17/237,410, filed on Apr. 22, 2021, now Pat. No. 11,683,737.

(51) Int. Cl.
*H04W 4/00* (2018.01)
*H04W 36/28* (2009.01)
*H04W 36/30* (2009.01)
*H04W 84/12* (2009.01)

(52) U.S. Cl.
CPC .......... *H04W 36/30* (2013.01); *H04W 36/28* (2013.01); *H04W 84/12* (2013.01)

(58) Field of Classification Search
CPC ..... H04W 36/30; H04W 36/28; H04W 84/12; H04W 36/0064; H04W 36/144; H04W 36/0058
USPC ........................................... 370/331
See application file for complete search history.

(56) References Cited

U.S. PATENT DOCUMENTS

| | | | |
|---|---|---|---|
| 7,656,961 B2 | 2/2010 | Vandenameele | |
| 8,320,346 B2 * | 11/2012 | Natan | H04W 48/18 709/221 |
| 8,756,456 B2 | 6/2014 | Katayama et al. | |
| 9,119,123 B2 * | 8/2015 | Hiben | H04W 76/16 |
| 9,661,515 B2 * | 5/2017 | Lord | H04W 24/02 |
| 10,158,532 B1 * | 12/2018 | Meredith | H04M 15/56 |

(Continued)

*Primary Examiner* — Amancio Gonzalez
(74) *Attorney, Agent, or Firm* — Shook, Hardy & Bacon L.L.P.

(57) ABSTRACT

Methods and systems are provided for signal offloading in an mmWave environment (e.g., in the event of high fading). The methods and systems include one or more mmWave nodes that are each configured to wirelessly communicate with a user device in a geographic service area and a Wi-Fi access point configured to wirelessly communicate with the user device. The methods and systems determine that fading or loading of an mmWave signal transmitted by one of the one or more mmWave nodes is above a threshold. In response to the fading or loading being above the threshold, the methods and systems redirect a control signal of the user device through the Wi-Fi access point to the one or more mmWave nodes, such that the user device maintains a dual connection with the Wi-Fi access point via the control signal and the mmWave node.

20 Claims, 5 Drawing Sheets

(56) References Cited

U.S. PATENT DOCUMENTS

| | | | | |
|---|---|---|---|---|
| 10,231,134 B1* | 3/2019 | Brisebois | ............... | H04W 16/04 |
| 10,237,797 B2* | 3/2019 | Nagasaka | ............. | H04W 36/22 |
| 10,271,314 B2* | 4/2019 | Sirotkin | ................. | H04W 4/70 |
| 10,484,882 B2* | 11/2019 | Torsner | ................ | H04W 16/28 |
| 10,498,868 B2* | 12/2019 | Sridhar | .................... | H04L 69/163 |
| 10,530,458 B2* | 1/2020 | Chen | ...................... | H04B 7/10 |
| 10,674,372 B2* | 6/2020 | Brisebois | .............. | H04L 43/087 |
| 10,932,254 B2* | 2/2021 | Xu | ......................... | H04W 76/22 |
| 11,108,168 B2 | 8/2021 | Rofougaran et al. | | |
| 11,265,884 B2 | 3/2022 | Sirotkin | | |
| 11,284,361 B2* | 3/2022 | Najla | ..................... | H04W 52/52 |
| 11,374,627 B1* | 6/2022 | Kulkarni | .............. | H04B 7/0465 |
| 11,375,382 B2* | 6/2022 | Brisebois | .............. | H04L 41/082 |
| 11,683,737 B1* | 6/2023 | Kulkarni | ............ | H04W 36/0064 370/331 |
| 2011/0002314 A1* | 1/2011 | Choi | ..................... | H04W 52/18 370/338 |
| 2014/0328190 A1* | 11/2014 | Lord | ..................... | H04W 24/08 370/252 |
| 2015/0215840 A1* | 7/2015 | Yiu | ....................... | H04W 76/15 370/329 |
| 2018/0213379 A1 | 7/2018 | Xiong et al. | | |
| 2019/0182007 A1* | 6/2019 | Liu | ....................... | H04L 5/0048 |
| 2021/0250800 A1* | 8/2021 | Meredith | ........... | H04W 28/0226 |
| 2021/0266915 A1* | 8/2021 | Sirotkin | .............. | H04W 72/542 |
| 2021/0297919 A1* | 9/2021 | Zhu | .................... | H04W 36/165 |
| 2021/0298063 A1* | 9/2021 | Damnjanovic | ....... | H04W 76/14 |
| 2021/0334862 A1* | 10/2021 | Goergen | ................. | G01S 13/87 |
| 2021/0360632 A1* | 11/2021 | Yang | ................... | H04J 13/0025 |
| 2022/0015150 A1 | 1/2022 | Ye et al. | | |
| 2022/0116814 A1* | 4/2022 | Di Girolamo | ........ | H04W 4/027 |

* cited by examiner

FIG. 5 mmWAVE TO WI-FI CONTROL SIGNAL OFFLOADING IN THE EVENT OF FADING IN THE mmWAVE SYSTEM

CROSS REFERENCE TO RELATED APPLICATIONS

This application is a continuation of, and claims priority from, U.S. patent application Ser. No. 17/237,410, filed on Apr. 22, 2021, entitled "mmWAVE TO WI-FI CONTROL SIGNAL OFFLOADING IN THE EVENT OF FADING IN THE mmWAVE SYSTEM"; which is hereby expressly incorporated herein by reference in its entirety.

SUMMARY

The present disclosure is directed, in part, to signal offloading in an mmWave environment supported by a telecommunication system during a high fading event. An mmWave node and a Wi-Fi access point are configured to wirelessly communicate with a user device in a geographic service area. Methods and systems receive information from the user device corresponding to an mmWave transmitted via the mmWave node and a Wi-Fi signal transmitted from the Wi-Fi access point. From the information received, the methods and systems determine a fading measurement corresponding to the mmWave is above a threshold. In response to the fading measurement being above the threshold, the methods and systems redirect a control signal of the user device through the Wi-Fi access point to the mmWave node. As such, the user device maintains a dual connection with the Wi-Fi access point and the mmWave node. Furthermore, data is transmitted from the user device via the Wi-Fi access point and to the mmWave node.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present technology is described in detail below with reference to the attached drawing figures, wherein.

DETAILED DESCRIPTION

The subject matter of embodiments of the present disclosure is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

2G Second-Generation Wireless Technology
3G Third-Generation Wireless Technology
4G Fourth-Generation Cellular Communication System
5G Fifth-Generation Cellular Communication System
ASIC Application-Specific Integrated Circuit
CD-ROM Compact Disk Read Only Memory
CDMA Code Division Multiple Access
eNodeB Evolved Node B
gNodeB Next Generation Node B
GSM Global System for Mobile Communications
DVD Digital Versatile Discs
EEPROM Electrically Erasable Programmable Read Only Memory
FD-MIMO Full Dimensional Multiple Input Multiple Output
FDMA Frequency Division Multiple Access
HSDPA High Speed Downlink Packet Access
IC Integrated Circuit
LTE Long Term Evolution
MIMO Multiple Input Multiple Output
mMIMO Massive Multiple Input Multiple Output
MU-MIMO Multiple User Multiple Input Multiple Output
OFDMA Orthogonal Frequency Division Multiple Access
PC Personal Computer
PDA Personal Digital Assistant
RAM Random Access Memory
RF Radio-Frequency
ROM Read Only Memory
RSRP Reference Signal Receive Power
RSRQ Reference Signal Receive Quality
RSSI Received Signal Strength Indication
SC-FDMA Single Carrier Frequency-Division Multiple Access
SINR Transmission-to-Interference-Plus-Noise Ratio
SMS Short Message Service
TDMA Time Division Multiple Access
UE User Equipment
UMTS Universal Mobile Telecommunications Systems
WCDMA Wideband Code Division Multiple Access
WiGig Wireless-Gigabit
WiMAX Worldwide Interoperability for Microwave Access Further, various technical terms are used throughout this description. An illustrative resource that fleshes out various aspects of these terms can be found in Newton's Telecom Dictionary, 31st Edition (2018).

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and non-removable media, and contemplate media readable by a database, a switch, and various other network devices. Network switches, routers, and related components are conventional in nature, as are means of communicating with the same. By way of example, and not limitation, computer-readable media comprise computer storage media and communications media.

Computer storage media, or machine-readable media, include media implemented in any method or technology for storing information. Examples of stored information include computer-useable instructions, data structures, program modules, and other data representations. Computer storage media include, but are not limited to RAM, ROM, EEPROM, flash memory or other memory technology, CD-ROM, DVD, holographic media or other optical disc storage, magnetic cassettes, magnetic tape, magnetic disk storage, and other magnetic storage devices and may be considered transitory, non-transitory, or a combination of both. These memory components can store data momentarily, temporarily, or permanently.

Communications media typically store computer-useable instructions, including data structures and program modules, in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, wireless telecommunication networks provide access for a user device to access one or more network services. In some cases, the desired network service may be a telecommunication service. Telecommunication services are widely deployed to provide various kinds of communication content, such as voice and data. Generally, telecommunication services involve multiple access systems capable of supporting communication content with multiple user devices by sharing available system resources (e.g., transmitted power and channel bandwidth). Examples of multiple access systems include a CDMA system, an FDMA system, a TDMA system, an OFDMA system, and a SC-FDMA system.

In the telecommunication services industry, there is an increased demand for available bandwidth to pass large amounts of data at a high data rate. This demand is expected to continue increasing. Due to this increase in demand, the telecommunication industry looked to other frequency bands for developing new 5G wireless technologies. The high-frequency bands in the spectrum above 24 GHz have the potential to support large bandwidths, high data rates, and to increase the capacity of wireless networks. High-frequency bands, or millimeter waves ("mmWaves"), have short wavelengths that are measurable in millimeters. As such, mmWave systems typically have frequency ranges in between 30 and 300 GHz, where a total of around 250 GHz bandwidths are available. Although mmWaves extend all the way up 300 GHz, the mmWaves ranging from 24 GHz to 100 GHz are generally used for 5G. The mmWaves up to 100 GHz are capable of supporting bandwidths up to 2 GHz, without having to aggregate bands together for higher data throughput.

Accordingly, communications in the mmWave region of the RF spectrum have emerged as providing a unique solution to the need for increased bandwidth to support high data rate wireless transmissions. Transmissions in the mmWave region of the RF spectrum offer extremely high data throughputs as a result of the ultra-wide bandwidth available. Further, mmWave communications are highly directional (e.g. directional antenna beam forming arrays are used to sustain reasonable transmission distances based on an atmospheric absorption of the transmitted RF energy). These highly directional communications offer some unique opportunities for mmWave communication schemes.

Telecommunication services in the mmWave region of the RF spectrum experience some difficulties. One difficulty, for example, includes an inherent issue of fading (e.g. varying channel conditions) compared to low band frequencies. Due to this fading, control signaling between one or more UEs and a cell site comprising one or more mmWave nodes is highly impacted. If an mmWave system has high fading, end user performance is significantly impacted due to poor control signaling. In conventional systems, UEs experiencing high fading are either handed off to other frequency bands and/or to other nodes having low data speeds to continue providing some communication support. Additionally, some conventional systems with UEs experiencing high fading merely delay the transmission of data. One problem with these conventional approaches includes highly diminished performance and perception of the network service (e.g. very slow transmission of data).

The systems and methods provided herein alleviate the problems discussed above. As one example, the systems and methods provide for improved control signaling between UE and cell site for faster data transmission for the UE experiencing high fading in the mmWave system. The systems and methods herein achieve the improved control signaling, in part, by redirecting the control signal of the UE through a Wi-Fi access point. Redirection of the control signal through the Wi-Fi access point and to the mmWave node results in the UE maintaining a dual connection with the Wi-Fi access point and the mmWave node. As such, data is transmitted from the UE, through the Wi-Fi access point, and to the mmWave node. Instead of handing off the UE to other frequency bands or to other nodes having low data speeds for continued service, the systems and methods provided herein prevent the highly diminished performance and perception of the network service experienced in the conventional systems.

Another benefit of the systems and methods herein includes redirecting the control signal based on the fading. For example, scheduling algorithms for controlling and mitigating network congestion are typically more robust for transmitting data with respect to fading than for control signaling. Utilizing the more robust scheduling algorithms with respect to fading provides more tools for checking and detecting fading in a timelier fashion, thereby preventing delays in data transmission that conventional systems experience. As such, the systems and methods herein provide for determining when to redirect the control signal without a lag or delay that scheduling algorithms for control signaling may have experienced.

In aspects, an mmWave system for signal offloading in the event of high fading are provided. The mmWave system comprises one or more mmWave nodes corresponding to a cell site and a Wi-Fi access point, the one or more mmWave nodes and the Wi-Fi access point configured to wirelessly communicate with a user device in a geographic service area. Further, one or more processors are configured to perform operations. For example, the operations comprise determining that the user device has detected that a fading measurement corresponding to an mmWave transmitted by one of the one or more mmWave nodes is above a threshold. Further, the operations comprise redirecting a control signal of the user device through the Wi-Fi access point to the one or more mmWave nodes. As such, the user device maintains a dual connection with the Wi-Fi access point via the control signal and the one or more mmWave nodes via the mmWave. Accordingly, data is transmitted from the user device via the Wi-Fi access point to the mmWave node.

In other aspects, one or more non-transitory computer-readable media disclosed herein can have computer-executable instructions embodied thereon that, when executed, perform a method for signal offloading in the event of high fading. A Wi-Fi signal strength is detected by a user device. A fading measurement corresponding to an mmWave is detected by the user device. Further, the fading measurement is determined to be above a threshold and the Wi-Fi signal strength is determined to satisfy a second threshold. In response, a control signal is redirected through a Wi-Fi access point to an mmWave node, such that the user device maintains a dual connection with the Wi-Fi access point via the control signal and the mmWave node via the mmWave. Accordingly, data is transmitted from the user device via the Wi-Fi access point to the mmWave node.

Yet another aspect of the present disclosure is directed to a method for signal offloading in the event of high fading. One or more fading measurements of a signal transmitted from an mmWave node are determined to be above a threshold. The one or more fading measurements are detected over a period of time and by a threshold number of user devices in communication with the mmWave node. Further, a user device is determined to be located within a range of a Wi-Fi access point and in communication with the mmWave node. Furthermore, a control signal of the user device is redirected through the Wi-Fi access point to the mmWave node, such that the user device maintains a dual connection with the Wi-Fi access point via the control signal and the mmWave node via the mmWave. Accordingly, data is transmitted from the user device via the Wi-Fi access point to the mmWave node.

Figure 1:
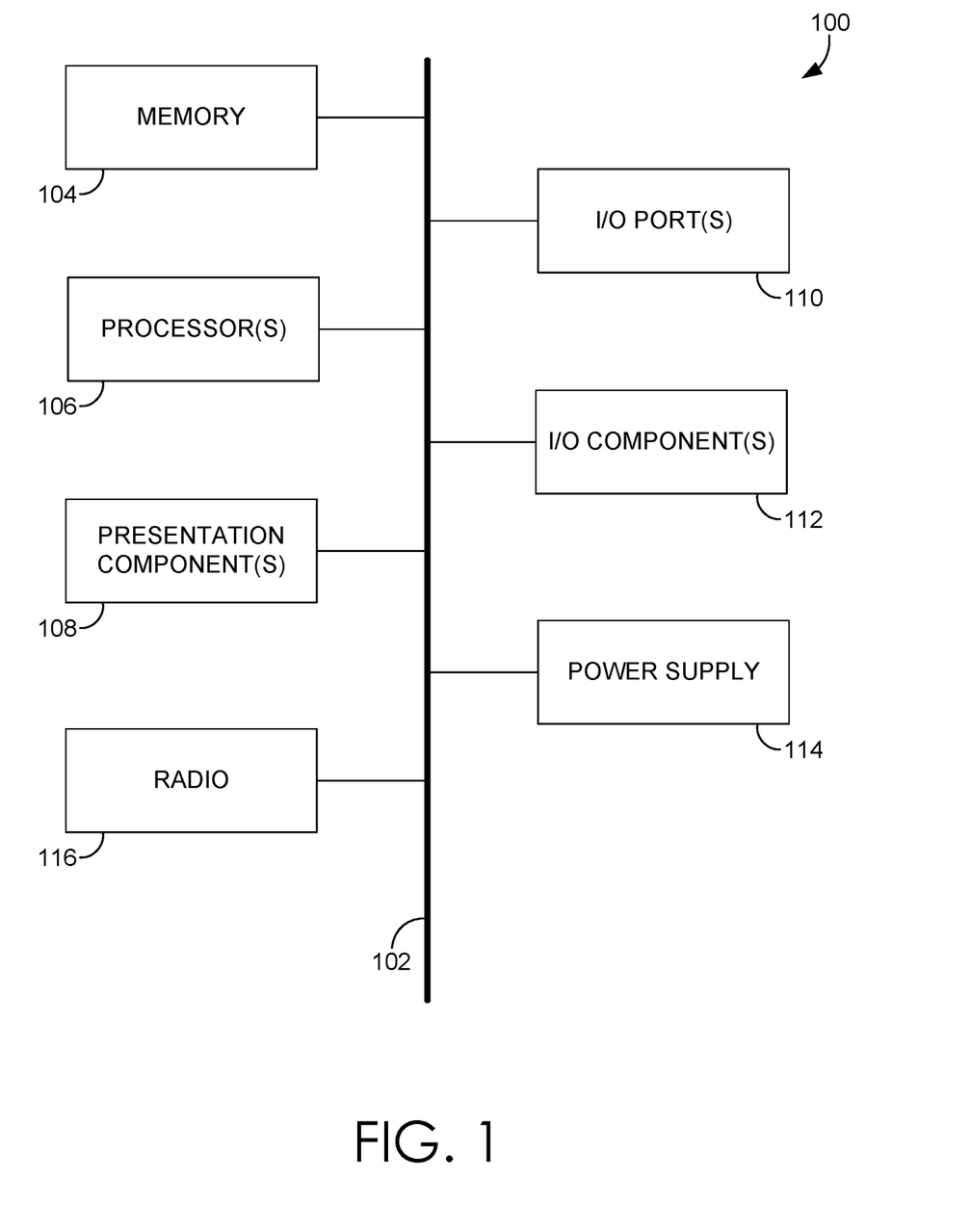
FIG. 1 depicts a diagram of an exemplary computing environment suitable for use in implementations of the present disclosure.

Turning now to FIG. 1, a diagram is depicted of an exemplary computing environment suitable for use in implementations of the present disclosure. In particular, the exemplary computer environment is shown and designated generally as user device 100. User device 100 is but one example of a suitable computing environment and is not intended to suggest any limitation as to the scope of use or functionality of the invention. Neither should user device 100 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, user device 100 includes bus 102 that directly or indirectly couples the following devices: memory 104, one or more processors 106, one or more presentation components 108, input/output (I/O) port(s) 110, I/O component(s) 112, power supply 114, and radio 116. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O component(s) 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "user device."

User device 100 typically includes a variety of computer-readable media. Computer-readable media can be any available media that can be accessed by user device 100. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Further, computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Turning to memory 104, memory 104 includes computer-storage media in the form of volatile and/or nonvolatile memory. Memory 104 may be removable, nonremovable, or a combination thereof. Examples of memory 104 include solid-state memory, hard drives, optical-disc drives, etc. For instance, memory 104 may include RAM, ROM, Dynamic RAM, a Synchronous Dynamic RAM, a flash memory, a cache memory, a buffer, a short term memory unit, a long term memory unit, or other suitable memory units. Removable memory may include, for example, a hard disk drive, a floppy disk drive, a Compact Disk drive, a CD-ROM drive, a DVD drive, or other suitable removable units.

Turning to the one or more processors 106, the one or more processors 106 read data from various entities such as bus 102, memory 104 or I/O component(s) 112. The one or more processors 106 include, for example, a Central Processing Unit, a Digital Signal Processor, one or more processor cores, a single-core processor, a dual-core processor, a multiple-core processor, a microprocessor, a host processor, a controller, a plurality of processors or controllers, a chip, a microchip, one or more circuits, circuitry, a logic unit, an IC, an ASIC, or any other suitable multi-purpose or specific processor or controller. Further, the one or more processors 106 execute instructions, for example, of an Operating System of the user device 100 and/or of one or more suitable applications.

Further, the one or more presentation components 108 present data indications to a person or other device. Examples of one or more presentation components 108 include a display device, speaker, printing component, vibrating component, etc. Additionally, I/O port(s) 110 allow user device 100 to be logically coupled to other devices including I/O component(s) 112, some of which may be built in user device 100. Illustrative I/O component(s) 112 include a microphone, joystick, game pad, satellite dish, scanner, printer, wireless device, etc.

Turning to radio 116, the radio 116 facilitates communication with a wireless telecommunications network. For example, radio 116 may facilitate communication via wireless communication signals, RF signals, frames, blocks, transmission streams, packets, messages, data items, and/or data. The terms "radio," "controller," "antenna," and "antenna array" are used interchangeably to refer to one or more software and hardware components that facilitate sending and receiving wireless radio-frequency signals, for example, based on instructions from a cell site. Radio 116 may be used to initiate and generate information that is then sent out through the antenna array, for example, where the radio and antenna array may be connected by one or more physical paths. Generally, an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via mmWaves, FD-MIMO, mMIMO, 3G, 4G, 5G, and/or 802.11 protocols and techniques.

Illustrative wireless telecommunications technologies that radio 116 may facilitate include CDMA, GPRS, TDMA, GSM, and the like. Radio 116 might additionally or alternatively facilitate other types of wireless communications including Wi-Fi, WiMAX, LTE, or other VoIP communications. As can be appreciated, in various embodiments, radio 116 can be configured to support multiple technologies and/or multiple radios can be utilized to support multiple technologies. A wireless telecommunications network might include an array of user devices.

Figure 2:
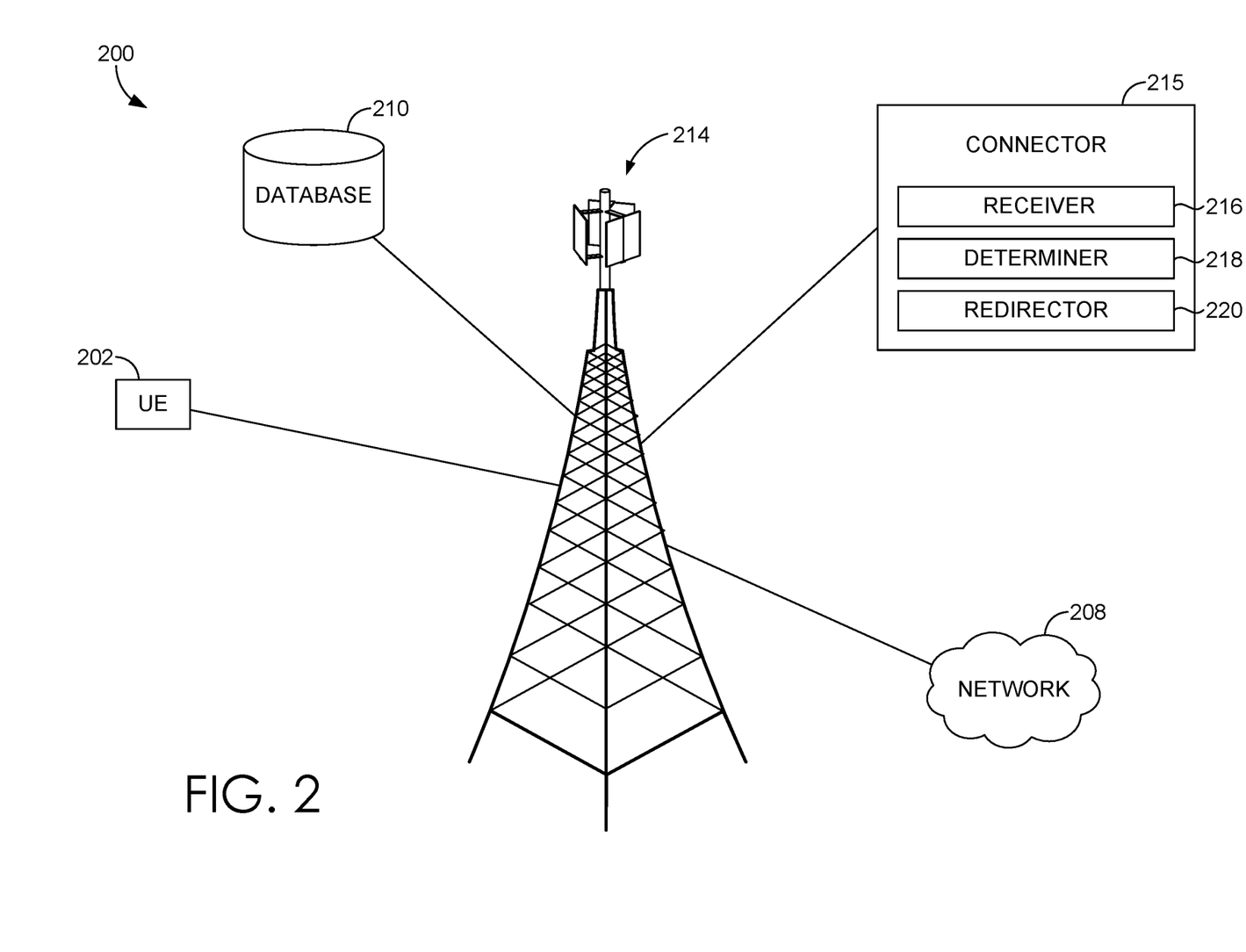
FIG. 2 illustrates a diagram of an example environment in which implementations of the present disclosure may be employed.

Turning now to FIG. 2, network environment 200 is an exemplary network environment in which implementations of the present disclosure may be employed. Network environment 200 is one example of a suitable network environment and is not intended to suggest any limitation as to the scope of use or functionality of the present disclosure. Neither should the network environment be interpreted as having any dependency or requirement relating to any one or combination of components illustrated.

Network environment 200 includes UE 202 (e.g. user device 100), network 208, database 210, cell site 214, and connector 215. In other embodiments, network environment 200 may contain more than one UE 202, more than one network 208, more than one database 210, and more than one cell site 214. The terms "UE" and "user device" are used interchangeably to refer to a device employed by an end-user that communicates using network 208. UE 202 generally includes one or more antennas coupled to a radio for exchanging (e.g., transmitting and receiving) transmissions with a nearby cell site (e.g. cell site 214), via an antenna array of the cell site. In embodiments, UE 202 may take on any variety of devices, such as a PC, a laptop computer, a tablet, a netbook, a mobile phone, a smart phone, a PDA, a wearable device, a fitness tracker, a server, a CD player, an MP3 player, a GPS device, a video player, a handheld communications device, a workstation, a router, an access point, or any other device capable of communicating using one or more resources of the network 208.

Further, UE 202 may include components such as software and hardware, a processor, a memory, a display component, a power supply or power source, a speaker, a buffer, a touch-input component, a keyboard, a radio, and the like. For example, UE 202 may include a transceiver module for performing wireless communication between other UE devices (not depicted). The transceiver module may include a dual-band transceiver module configured for communicating over various frequency bands via one or more backhaul links (e.g. a wireless link or a wired link). Additionally, transceiver module may be configured for communicating with cell site 214 via one or more control links.

In some embodiments, the transceiver module may include at least one low-band transceiver (e.g. for communicating over one or more control links) and at least one high-band transceiver. In some embodiments, a transceiver of the transceiver module may perform the functionality of a cellular transceiver (e.g., an LTE transceiver) for communication over a non-mmWave (e.g., a 2.4 GHz frequency band). In some embodiments, other transceivers may perform the functionality of an mmWave transceiver (e.g., a WiGig or IEEE 802.11ad transceiver) for communication over an mmWave (e.g., a 60 GHz frequency band).

The transceiver module of UE 202 may comprise one or more antennas suitable for transmitting and/or receiving wireless communication signals, blocks, frames, transmission streams, packets, messages and/or data. For example, the one or more antennas may include any an arrangement of one or more antenna elements, components, units, assemblies and/or arrays that are suitable for directional communication (e.g., beamforming techniques). In embodiments, the one or more antennas may include a phased array antenna, a multiple element antenna, a set of switched beam antennas, etc. In some embodiments, the one or more antennas may implement transmit and receive functionalities using separate transmit and receive antenna elements. In some embodiments, the one or more antennas may implement transmit and receive functionalities using common and/or integrated transmit/receive elements.

Furthermore, the UE 202 may comprise any mobile computing device that communicates by way of a wireless network (e.g., 3G, 4G, 5G, LTE, CDMA, or any other type of network). In embodiments, UE 202 may be capable of using 5G and having backward compatibility with prior access technologies. In some embodiments, UE 202 may be capable of using 5G but lacks backward compatibility with prior access technologies. In some embodiments, UE 202 is a legacy UE that is not capable of using 5G.

In some cases, the UE 202 in network environment 200 may optionally utilize network 208 to communicate with other computing devices (e.g., a mobile device(s), a server(s), a PC, etc.) through cell site 214. The network 208 may be a telecommunications network(s), or a portion thereof. Network 208 may comprise a 2G, 3G, 4G, 5G, or other next generation network. In some embodiments, network 208 may comprise a cloud-radio access network located in or associated with a cloud computing environment having various cloud network components. A telecommunications network might include an array of devices or components (e.g., one or more cell sites), some of which are not shown. Those devices or components may form network environments similar to what is shown in FIG. 2, and may also perform methods in accordance with the present disclosure. Components such as terminals, links, and nodes (as well as other components) may provide connectivity in various implementations. Network 208 may include multiple networks, as well as being a network of networks, but is shown in more simple form so as to not obscure other aspects of the present disclosure.

Network 208 may be part of a telecommunication network that connects subscribers to their service provider. In aspects, the service provider may be a telecommunications service provider, an internet service provider, or any other similar service provider that provides at least one of voice telecommunications and data services to UE 202 and any other UEs. For example, network 208 may be associated with a telecommunications provider that provides services (e.g., LTE) to the UE 202. Additionally or alternatively, network 208 may provide voice, SMS, and/or data services to user devices or corresponding users that are registered or subscribed to utilize the services provided by a telecommunications provider. Network 208 may comprise any communication network providing voice, SMS, and/or data service(s), using any one or more communication protocols, such as a 1x circuit voice, a 3G network (e.g., CDMA, CDMA2000, WCDMA, GSM, UMTS), a 4G network (WiMAX, LTE, HSDPA), and a 5G network including mmWaves. The network 208 may also be, in whole or in part, or have characteristics of, a self-optimizing network. In aspects, the network 208 may be a public or private network.

Turning to cell site 214, the terms "cell site" and "base station" may be used interchangeably herein to refer to a defined wireless communications coverage area (i.e., a geographic area) serviced by a base station. It will be understood that one cell site may control one coverage area or alternatively, one cell site may control multiple coverage areas. As discussed herein, a cell site is deployed in the network to control and facilitate, via one or more antenna arrays comprising one or more mmWave nodes, the broadcast, transmission, synchronization, and receipt of one or more wireless signals in order to communicate with, verify, authenticate, and provide wireless communications service coverage to one or more UEs that request to join and/or are connected to a network.

In some implementations, cell site 214 is configured to communicate with the UE 202 that is located within the geographical area defined by a transmission range and/or receiving range of the radio antennas of cell site 214. The geographical area may be referred to as the "coverage area" of the cell site or simply the "cell," as used interchangeably hereinafter. Cell site 214 may include one or more cells, band pass filters, radios, antennas, antenna arrays, power amplifiers, transmitters/receivers, digital signal processors, control electronics, GPS equipment, and the like. In particular, cell site 214 may be configured to wirelessly communicate with devices within a defined and limited geographical area. For the purposes of the present disclosure, it may be assumed that it is undesirable and unintended by the network 208 that the cell site 214 provide wireless connectivity to the UE 202 when the UE 202 is geographically situated outside of the cell associated with cell site 214.

In one aspect, the cell site 214 serves at least one sector of a cell associated with the cell site 214, and at least one transmit antenna for propagating a signal (e.g., an mmWave) from the base station to one or more of the UE 202. In other aspects, the cell site 214 may comprise multiple transmit antennas for a plurality of cell sites, any one or more of which may serve at least a portion of the cell. In some aspects, the cell site 214 may comprise one or more macro cells (providing wireless coverage for users within a large geographic area). For example, macro cells may correspond to a coverage area having a radius of approximately 1-15 miles or more, the radius measured at ground level and extending outward from an antenna at the cell site. In some aspects, cell site 214 may comprise, or be in communication with, one or more small cell (providing wireless coverage for users within a small geographic area). For example, a small cell may correspond to a coverage area having a radius of approximately less than three miles, the radius measured at ground level and extending outward from an antenna at the cell site. In embodiments, cell site 214 is in communication with a plurality of in-door small cells.

Furthermore, the one or more small cells may support mmWaves via mmWave nodes corresponding to an antenna. Additionally, the one or more small cells may combine a plurality of 100 MHz channels. Continuing the example, the one or more small cells may also combine radio and antenna elements. Further, the one or more small cells may each have an Ethernet cable backhaul. Additionally, the one or more small cells may have the capability of transferring data to multiple user devices during a single point in time via a plurality of antennas (e.g. via an MU-MIMO antenna system).

In some embodiments, the cell site 214 has one or more multi-directional antennas comprising a plurality of signal transmitters, each configured to broadcast a signal over a respective sector of coverage of the one or more multi-directional antennas. The cell site 214 further comprises a control server in communication with the one or more multi-directional antennas. The control server is configured to detect a disruption in a control signal provided to the one or more multi-directional antennas, the disruption altering a first coverage footprint of the one or more multi-directional antennas, such that the first coverage footprint overlaps with a second coverage footprint of another multi-directional antenna.

Turning to connector 215, connector 215 is in communication with cell site 214. Connector 215 comprises a receiver 216, a determiner 218, and a redirector 220. The connector 215 is responsible for providing connection between cell site 214 and UE 202 (or multiple UEs) via one or more mmWaves via one or more mmWave nodes. In embodiments, the connector 215 provides a dual connection for UE 202 and the cell site 214 via a control signal and an mmWave. Continuing the example, the control signal propagates from the UE 202 to a Wi-Fi access point that is separate from cell site 214 and at a different location than cell site 214. Further, the control signal is then received by the cell site 214 from the Wi-Fi access point.

Turning to receiver 216, the receiver 216 may receive data or retrieve stored data from the UE 202, the network 208, the database 210, and the cell site 214. Information that receiver 216 receives may include (or take into account) a UE's capability, such as the number of antennas of the UE and the type of receiver used by the UE for signal detection. Similarly, receiver 216 may take into account the capability of the network 208, the database 210, and the cell site 214 (e.g., antennas of the cell site). The receiver 216 may also be configured to receive information from cell sites other than cell site 214 or other processors and/or servers.

In some embodiments, receiver 216 may receive data via communications across one or more backhaul links that are wired or wireless links. In some embodiments, a plurality of backhaul links include both wired and wireless links. Additionally, receiver 216 may receive a request from UE 202 and other UEs for access to a particular frequency band. Continuing the example, receiver 216 may receive information from cell site 214 that a plurality of carriers share the particular frequency band, and that one of those carriers is intermittently available. Further, receiver 216 may also receive payload size for uplink transmissions from the UE 202, from other UEs, and from the cell site 214. For example, cell site 214 may determine the payload size or detect the payload size upon receipt of the uplink transmission from UE 202 or from a plurality of UEs.

Further, receiver 216 may receive access information from cell site 214 upon granting UE 202 and other UEs access to a particular mmWave. Access information granted to UE 202 and to the other UEs may include grants for the same, similar, or different transmission opportunities or subframes. The access information may include information corresponding to resources assigned to the UE 202 and the other UEs, including formatting of the message granting access (e.g., different downlink control indicator formats). Other access information may include physical uplink shared channel or control information (e.g., a physical uplink control channel). Information relating to the physical uplink control channel, including payload size, feedback, bandwidth, and channel state information, may also be received by the receiver 216.

In some embodiments, the receiver 216 may receive information specific to the UE 202 or to the other UEs. For example, receiver 216 may receive battery information corresponding to UE 202 and other UEs (not depicted), such as a percentage of a remaining battery life and a number of other factors contributing to battery life, including as RAM, level of brightness settings, type of battery, a current battery consumption rate, etc. Other information specific to UEs that the receiver 216 may receive includes input power information (such as a capability to handle a range of energy for a duration of time, for example) comprising a maximum input power. Additional information specific to the UEs the receiver 216 may receive include output power information (such as a capability to transmit or process a range of energy for a duration of time, for example). In embodiments, the output power information depends upon an application as well as processing capabilities of the phone.

Furthermore, data the receiver 216 may receive also includes location information corresponding to UE 202, other UEs (not depicted), cell site 214, an antenna, and/or a coverage area, for example. Location information may be received from UE 202 (and/or other UEs), the network 208, the database 210, and/or the cell site 214. In embodiments, the location information is determined by the cell site 214 and/or UE using GPS or other satellite location services, terrestrial triangulation, an access point location, or any other means of obtaining coarse or fine location information. Location information may include whether UE 202 or other UEs are located outdoors or in a building. In embodiments, location information includes a geographic location of UE 202 and a three dimensional location.

In some embodiments, receiver 216 may receive location information stored in database 210 (e.g. location information stored in a cloud service). Continuing the example, database 210 may have current location information and historical location information comprising GPS coordinates. In embodiments, database 210 is updated after each subsequent predetermined time period (the predetermined time period configurable by a network operator, for example). In some embodiments, database 210 is updated during a predetermined time period (the predetermined time period configurable by a network operator, for example). In some embodiments, receiver 216 may receive location information corresponding to UE 202 from both the database 210 and an update message from the UE 202. In some embodiments, location information may include a physical address.

In addition to location information, receiver 216 may also receive channel quality information corresponding to various signals (e.g., a Wi-Fi signal, a control signal, an mmWave, etc.). Channel quality information may indicate the quality of communications between one or more UEs and a particular cell site (e.g. UE 202 and cell site 214). In embodiments, channel quality information may quantify how communications are traveling over a particular communication channel, thereby indicating when communication performance is negatively impacted or impaired. As such, channel quality information may indicate a strength of a received signal, a realized uplink and/or downlink transmission data rate of cell site 214 and/or UEs communicating with the cell site 214, observed SINR and/or signal strength at the UEs, or throughput of the connection between the cell site and the UEs.

In embodiments, receiver 216 receives channel quality information comprising cell site 214 heat signature information, cell site 214 component performance information, and/or processor load measurements. For example, heat signature information of the cell site 214 includes component model, component type, manufacturer, age of a component, wear and tear due to environmental factors, etc. Further, additional channel quality information received may also include an amount of current, backhaul link traffic, or an anticipated current or backhaul link traffic.

Further, receiver 216 receives channel quality information corresponding to an mmWave and communications between UE 202 and other UEs with cell site 214. For example, the channel quality information may correspond to wireless communication protocols and wireless telecommunications networks associated with particular mmWaves. As another example, cell site 214 may receive mmWave feedback via a feedback reporting procedure comprising information about antenna configuration, signal-to-noise ratio, types of UE receivers, and so forth. The mmWave feedback may include downlink transmission data from cell site 214 transmitted via one or more uplink mmWaves at predetermined time intervals. In addition to the mmWave feedback, receiver may also receive one or more fading measurements corresponding to one or more mmWaves.

In some embodiments, the one or more fading measurements may be received from UE 202 and/or other UEs. For example, the one or more fading measurements may include a detected signal strength of a particular mmWave. In embodiments, an mmWave may experience fading outdoors due to atmospheric turbulence; further, an mmWave may experience fading indoors. For both indoor and outdoor fading measurements, receiver 216 may receive information pertaining to one or more effects of each fading measurement, a time that each measurement of fading had subsided, a length of duration of each fading measurement, a direction of maximum fading, and average fade duration of all of the fading measurements. In embodiments, the average fade duration may be received for a quantity of fading measurements during a period of time.

Further, received fading measurements may depend upon (or may include information regarding) angular spread, fading amplitude, frequency domain level crossing rate, large-scale fading coefficients, small-scale fading coefficients, first-order fading statistics (e.g,. for a short-term fading signal), second-order fading statistics, polarization at transmitter and receiver, distance between mmWave node and UE, and fast fading distribution changes from Rician to Nakagami. Additionally, received fading measurements may depend upon (or may include information regarding) quantifiers for second-order fading statistics, including coherence distance, average fade duration, level crossing rate, and spatial auto-covariance. Other received information corresponding to the fading measurements may include under-observation amplitude threshold-level, maximum Doppler frequency, and different envelope distributions.

In embodiments, receiver 216 receives RSRP and RSRQ data. For example, mmWaves may experience fading both indoor and outdoor due to RSRP and RSRQ. Fluctuations of RSRP or RSRQ over a period of time may impact fading measurements. Additionally, receiver 216 may receive fading measurements from UE 202 and the other UEs based on an RSRP and/or and RSRQ measurement at a point in time that was then compared to a threshold value. In embodiments, receiver 216 may only receive fading measurements that satisfy the threshold value. In other embodiments, receiver 216 receives only fading measurements that satisfy the threshold value and that satisfy a predetermined duration of time.

In addition to channel quality information corresponding to the mmWave, receiver 216 also receives channel quality information corresponding to one or more Wi-Fi signals from one or more Wi-Fi access points. In embodiments, received Wi-Fi signal information includes an RSSI for one or more Wi-Fi access points for a plurality of locations of a geographical area. Receiver 216 also receives Wi-Fi access point location information corresponding to locations where Wi-Fi scans have occurred. Further, receiver 216 receives trace data comprising sensor logs of data output from sensors of UEs or other devices throughout the geographical area. An RSSI for the one or more Wi-Fi signals may weaken at distances that are farther from the location of the Wi-Fi access point. Additionally, Wi-Fi signal strength may be affected by a distance between a Wi-Fi router and a UE, a physical barrier deflecting the Wi-Fi signal, and the capability of a network adapter or antennas of the Wi-Fi access point.

In addition to Wi-Fi signal quality information, receiver 216 also receives channel quality information corresponding to one or more control signals. For example, the receiver 216 may receive, from the control server of the cell site 214, disruption information relating to the control signal. In aspects, the receiver 216 may receive information corresponding to a change of the first coverage footprint to a second coverage footprint. Further, receiver 216 may receive, from the control server, a power level of the one or more multi-directional antennas or a power level change for modification of coverage provided by the multi-directional antenna.

Receiver 216 may also receive channel quality information pertaining to traffic volume (e.g., a number of UEs transmitting or receiving data via the one or more mmWaves, a number of UEs transmitting or receiving data via the one or more Wi-Fi signals). Traffic volume may be received depending upon the day and time of day. For example, more channel quality data may be received during a world event, such as a natural disaster, terror attack, or pandemic. Additionally, factors affecting channel quality may include a quantity of users connected to the mmWave or antenna properties at a time of receiving communication parameters from UEs connected to the mmWave via the one or more mmWave nodes. Other factors affecting channel quality may also include a capacity of the mmWave and corresponding mmWave node, and data received from the quantity of users connected to or in communication with the mmWave node. The data received from the quantity of users may comprise a rate at which UEs are connected to and disconnected from the mmWave node.

Turning to determiner 218, the determiner 218 may determine a fading measurement corresponding to an mmWave associated with one or more mmWave nodes is above a threshold. In embodiments, the determination is made based on a particular number of UEs transmitting and/or receiving information via with the one or more mmWave nodes for a predetermined period of time. For example, the determination that the fading measurement is above the threshold is based on information received from UE 202 and other UEs in communication with the one or more mmWave nodes. Additionally, the determination may also be based on a comparison of a signal strength of a particular mmWave with another mmWave. In some embodiments, determining the fading measurement is above the threshold is based on fading measurements received from another device comprising a fading measurement model. Additionally, the determination may be based on fading measurements received from a combination of one or more UEs and one or more fading measurement models.

Further, the determination that the fading measurement is above the threshold may also be based on a combination of factors including one or more of: angular spread, fading amplitude, frequency domain level crossing rate, large-scale fading coefficients, small-scale fading coefficients, first-order fading statistics, second-order fading statistics, polarization at transmitter and/or receiver, distance between mmWave node and UE, and fast fading distribution changes, coherence distance, average fade duration, and spatial auto-covariance. Additionally, in some embodiments, the determination that the fading measurement is above the threshold is based on a maximum Doppler frequency and different envelope distributions. Further, the determination that the fading measurement is above the threshold may also be based on a plurality of channel quality information (e.g., the observed SINR, anticipated current or backhaul link traffic, mmWave feedback received from the feedback reporting procedure, and indoor fading measurements).

Determiner 218 may also determine whether the mmWave (or other mmWaves) has a high loading volume. As one example, the determiner 218 may determine an amount of data queued for transmission by the mmWave on a backhaul link. Further, the determined amount of data may be based on a quantity of UEs communicating with an mmWave node. Furthermore, the determined amount of data queued for transmission by the mmWave may be made at least in part on communication signals for UE 202 requesting access for communication with the mmWave and historical loading data of UEs for the mmWave. In some embodiments, determiner 218 may determine the loading volume is high based on access information granted to various UEs.

Further, the determiner 218 may determine the threshold for the fading measurement corresponding to the mmWave. In embodiments, the determined threshold is based on the frequency range of a corresponding mmWave system or a bandwidth corresponding to the mmWave. In addition, the threshold may be determined based on a number of UEs transmitting or receiving data via the corresponding mmWave and/or a loading volume of the mmWave. The threshold may also be determined based on channel quality information, such as heat signature information of the cell site 214 or heat signature information of another cell site in communication with UE 202 and cell site 214. For example, the threshold may be lower for an mmWave transmitted via a newer component model corresponding to cell site 214 than for an older component model transmitting another mmWave.

As another example, the threshold may be determined from received signal-to-noise ratios of a plurality of mmWaves via a feedback reporting procedure. Continuing the example, if the signal-to-noise ratio for a particular time period is higher than 1:1 for two mmWaves, the mmWave with the higher signal-to-noise ratio may have a higher threshold than the other mmWave. In some embodiments, the threshold for a particular mmWave may be adjusted based on a fading measurement subsiding or reducing. In some embodiments, the threshold may be adjusted based on a predicted or known length of duration for a particular fading measurement.

As another example, determiner 218 may determine the threshold based on received RSRP and RSRQ data, battery information, granted access information, and location information. For example, a particular UE located at a far distance from an mmWave node with a low percentage of a remaining battery life may have a lower threshold than a UE located closer to the mmWave node with a much higher percentage of a remaining battery life. As another example, the threshold may be determined using RSRP values from a plurality of UEs detecting fluctuations in RSRP values for a predetermined duration of time. In some embodiments, the threshold may be determined using RSRQ values from a plurality of UEs detecting RSRQ values outside of a predetermined range for a period of time.

In some embodiments, determiner 218 determines UE 202 has a greatest available electrical power overhead (i.e., UE 202 can operate with the highest power output) relative to other UEs within the geographical area based on the information specific to UEs received by the receiver 216. For example, determiner 218 makes this determination based on a maximum input power, a maximum output power, and processing capabilities of UE 202 and other UEs located in the geographical area. As another example, this determination may be made based on a percentage of a remaining battery life, RAM, level of brightness settings, type of battery, and/or a current battery consumption rate of UE 202 and other UEs located in the geographical area.

In some embodiments, determiner 218 determines a distance of UE 202 (and other UEs) from cell site 214 by estimating the distance based on an evaluation of a signal delay for transmission between UE 202 and the cell site 214. In other embodiments, determiner 218 determines the distance of UE 202 and other UEs from cell site 214 by trilateration and satellite positioning. Continuing the example, determiner 218 may compare UE satellite positioning with a location of the cell site 214. Additionally, UE location information may be determined using a received signal strength of a respective frequency that the UE and cell site 214 communicate through. Continuing this example, determiner 218 may determine a location of the UE based on a coverage map comprising RSSI values. In some embodiments, determiner 218 determines a location of UE 202 by tracking the UE 202 via an RF beam. Further, determiner 218 may determine a location of UE 202 using terrestrial triangulation and location information stored in database 210.

In embodiments, location information is used to determine whether UE 202 is within a range of a Wi-Fi access point. Additionally, determiner 218 may determine whether a signal strength of a Wi-Fi signal from the Wi-Fi access point is above a second threshold. For example, determining whether the signal strength is above the second threshold may be based on an RSSI value. In some embodiments, determining whether the signal strength is above the second threshold is based on trace data (e.g., data from the sensor logs). The second threshold may be determined based on a location of a UE from the Wi-Fi access point. In some embodiments, the second threshold is determined based on a distance between a Wi-Fi router and the UE, a location of a physical barrier (e.g., a monument or building), and the capability of the antennas of the Wi-Fi access point.

Turning to redirector 220, redirector 220 redirects a control signal of the UE based upon the determinations of the determiner 218. For example, redirector 220 redirects the control signal through the Wi-Fi access point to the one or more mmWave nodes. Further, redirector 220 provides for a dual connection of the UE with both of the Wi-Fi access point (via the control signal) and the one or more mmWave nodes (via the mmWave).

In some embodiments, redirector 220 redirects the control signal based on the mmWave having a fading measurement above the first threshold. Continuing the example, the redirector 220 may redirect the control signal based on the Wi-Fi signal having a signal strength above the second threshold and/or the UE having the greatest available electrical power overhead relative to the other UEs within the geographical area. In addition, redirecting the control signal may be further based on disruption information relating to the control signal and the power level of the one or more multi-directional antennas corresponding to cell site 214.

In some embodiments, redirector 220 redirects the control signal further based on traffic volume. For example, in addition to the fading measurement being above the threshold, redirector 220 redirects the control signal based on the number of UEs transmitting data via the mmWave having the fading measurement above the threshold. As another example, redirector 220 redirects the control signal based on antenna properties of the mmWave node and the rate at which UEs are connected to and disconnected from the mmWave node.

In some embodiments, in addition to the fading measurement being above the first threshold, redirector 220 redirects the control signal based on the distance of UE 202 and other UEs from cell site 214. For example, redirector 220 may redirect the control signal based on based on a an RSSI value from the coverage map and the location of the corresponding UE. In addition, redirector 220 may redirect the control signal of a plurality of UEs based on their location and based on each of the plurality of UEs having an RSRQ value outside of a predetermined range for a predetermined period of time. In some embodiments, redirector 220 may redirect the control signal for a particular UE based on the particular UE having a predicted or known length of duration for a particular fading measurement based on historical fading measurement data stored in the database 210.

Additionally, the control signal is further redirected, upon the fading measurement being below or at the threshold, for direct transmission from the UE to the one or more mmWave nodes (rather than through the Wi-Fi access point). Continuing the example, the control signal is redirected for direct transmission from the UE to the one or more mmWave nodes based on the Wi-Fi signal also being below or at the second threshold. Further continuing the example, the control signal is redirected for direct transmission from the UE to the one or more mmWave nodes based on the mmWave also having a signal strength below a third threshold and/or based on battery information of the UE. In some embodiments, the control signal is redirected for direct transmission from the UE to the one or more mmWave nodes based on the UE having the an available electrical power overhead above a threshold.

Figure 3:
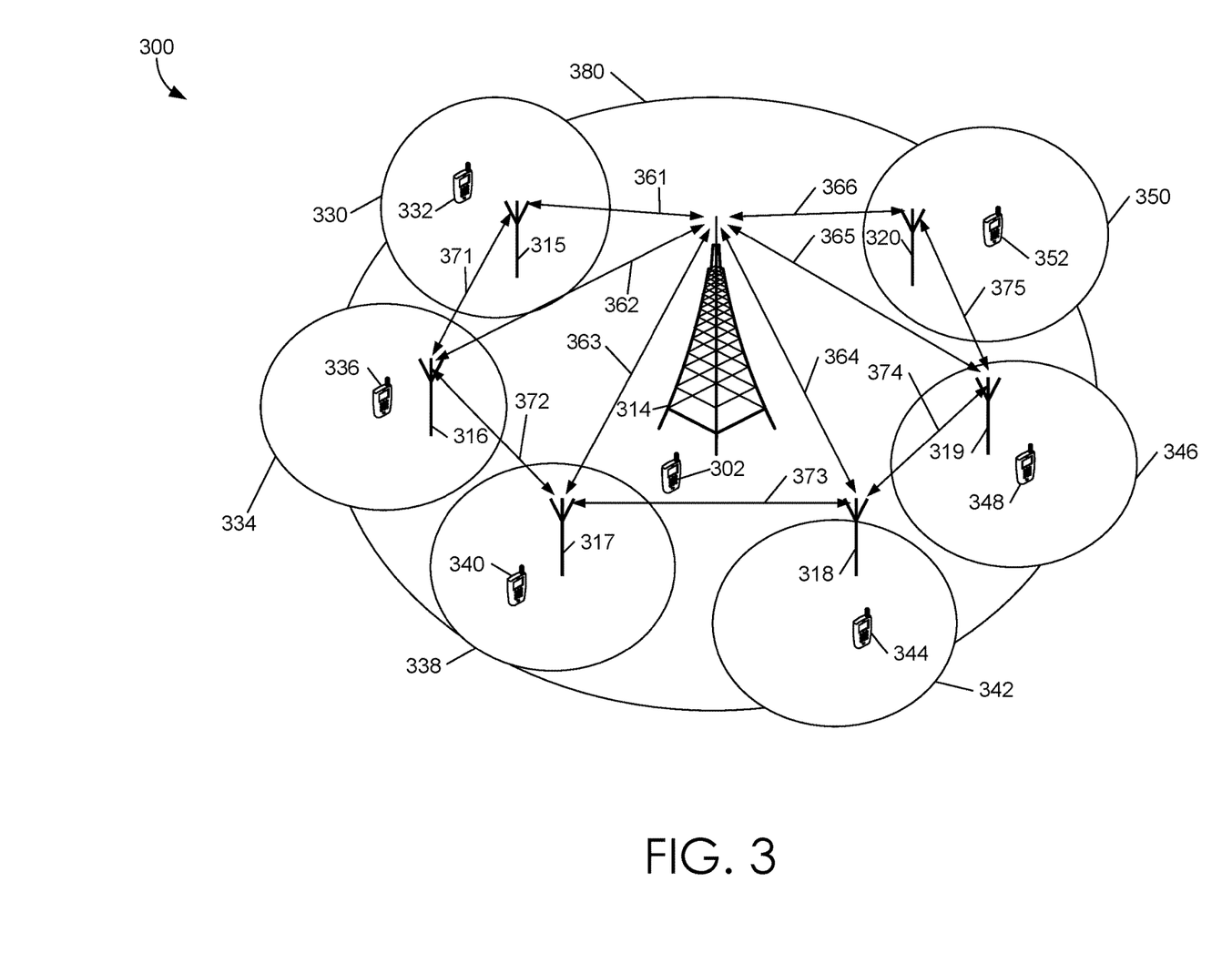
FIG. 3 illustrates an example system in which implementations of the present disclosure may be employed.

Turning now to FIG. 3, system 300 includes UE 302, cell site 314, and wireless communication access points 315-320, each of which comprise one or more Wi-Fi access points. Access points 315-320 communicate with UEs 332, 336, 340, 344, 348, and 352 via wireless communication cells 330, 334, 338, 342, 346, and 350. Although only one UE per wireless communication cell is depicted, more than one UE may be located within each wireless communication cell. In addition to one or more Wi-Fi access points, access points 315-320 may perform additional functionality including that of a cell site, a WiGig node or station, a WiMAX node or station, a cellular node, an eNodeB, a pico eNodeB, an LTE node, a hot spot, a network controller, and the like.

In some embodiments, a plurality of wireless and/or wired backhaul links 371-375 may be utilized to connect access points 315-320 to a core network for communication over one or more mmWaves. In embodiments, the backhaul links 371-375 include high-throughput links. Further, the backhaul links 371-375 may include directional multi-gigabit links, links according to the WiGig specifications, links according to the IEEE 802.11ad specification, and the like. In embodiments, the backhaul links 371-375 may include any other wireless communication links over any other wireless communication frequency band and/or according to any other wireless communication standard and/or specification. In some embodiments, the backhaul links 371-375 may have scheduling algorithms and failure management implementations.

In some embodiments, cell site 314 communicates with the access points 315-320 via the backhaul links 371-375 and a plurality of control links 361-366. For example, cell site 314 communicates with the following: access point 315 via a control link 361, access point 316 via a control link 362, access point 317 via a control link 363, access point 318 via a control link 364, access point 319 via a control link 365, and access point 320 via a control link 366. Further, control links 361-366 may be configured for communicating control information between cell site 314 and access points 315-320. As such, cell site 314 communicates with UEs 332, 336, 340, 344, 348, and 352 via access points 315-320. Access points 315-320 may include a downlink for communicating downlink data to the UEs. Additionally, access points 315-320 communicate uplink data from the UEs. In some embodiments, each access point 315-320 may simultaneously receive and/or transmit data via one or more of backhaul links 371-375 and one or more of control links 361-366.

In some embodiments, system 300 determines that one or more fading measurements of a signal transmitted from an mmWave node of the cell site 314 are above a threshold. For example, system 300 may make this determination from received fading measurements via one or more of UEs 332, 336, 340, 344, 348, and 352. System 300 may also make this determination based on additionally received fading measurements from one or more fading models. Continuing the example, one or more of backhaul links 371-375 and control links 361-366 may communicate the fading measurements received to the cell site 314. Additionally, system 300 determines one or more of UEs 332, 336, 340, 344, 348, and 352 are within one or more of cells 330, 334, 338, 342, 346, and 350. Upon determining UEs 332, 336, 340, 344, 348, and 352 are within the respective cell, system 300 may determine that at least one of UEs 332, 336, 340, 344, 348, and 352 is in communication with a Wi-Fi signal via at least one of access points 315-320.

In some embodiments, system 300 redirects a control signal of one or more of UEs 332, 336, 340, 344, 348, and 352 via control links 361-366. In one embodiment, system 300 redirects control signal of UE 332 through Wi-Fi access point 315 to an mmWave node corresponding to cell site 314. Continuing the example, UE 332 maintains a dual connection with the cell site 314 via both the Wi-Fi access point 315 and a direct connection via the mmWave and an mmWave node of the cell site 314. In another embodiment, system 300 redirects control signal of UE 348 through Wi-Fi access point 319 to the mmWave node corresponding to cell site 314. Further, upon a determination that a fading measurement of the mmWave is below or at a threshold, system 300 again redirects control signal of UE 348 for direct transmission from the UE 348 to the cell site 314.

Figure 4:
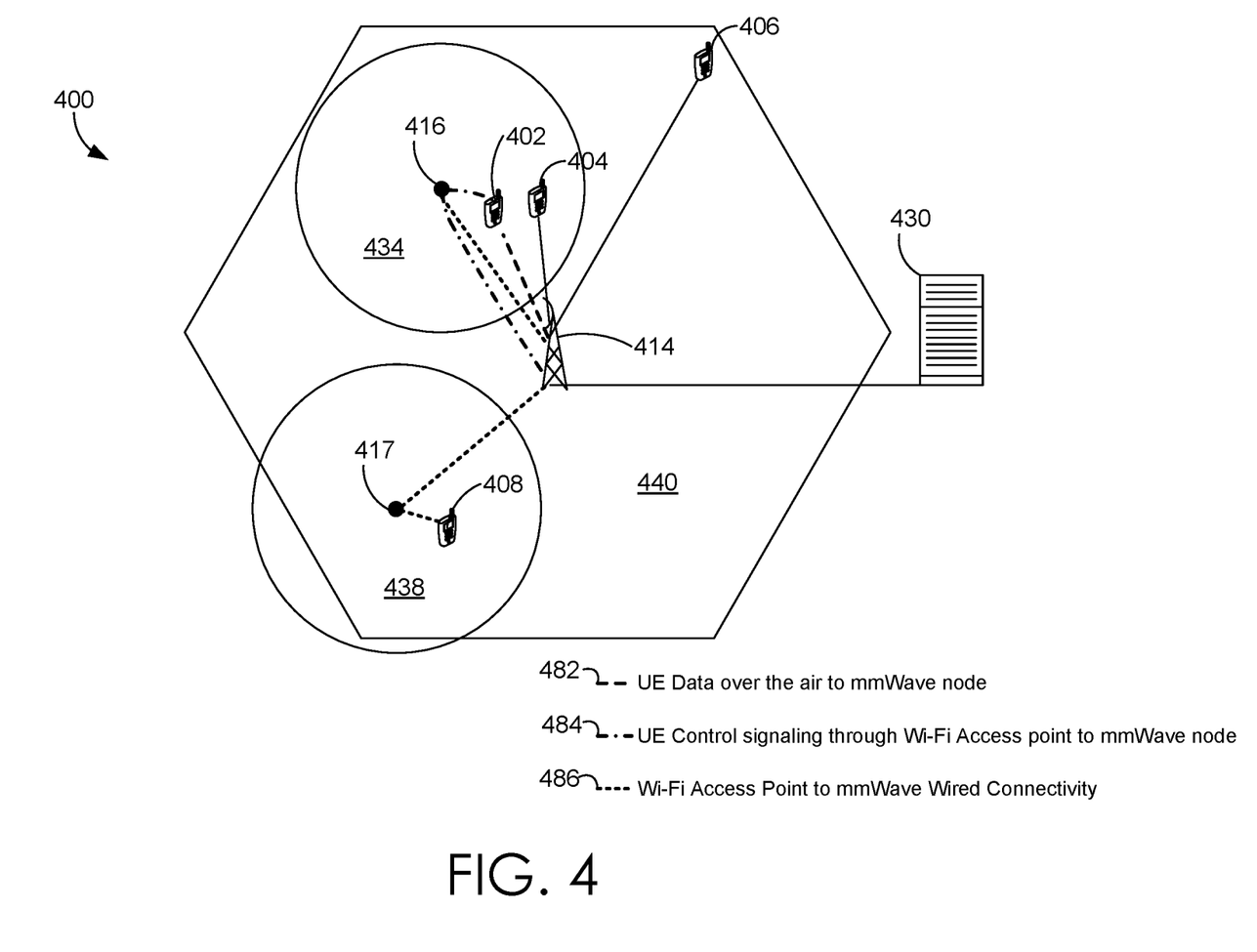
FIG. 4 depicts an example system in which a user device maintains a dual connection with a Wi-Fi access point and an mmWave node.

Turning now to FIG. 4, system 400 includes UEs 402, 404, 406, and 408 located within communication cell 440 of cell site 414. Cell site 414 provides coverage to a geographical area of the communication cell 440. Further, UEs 402 and 404 are also within a communication cell 434 of access point 416. UE 408 is also within a communication cell 438 corresponding to access point 417. In some embodiments, cell site 414 grants UEs 402, 404, 406, and 408 access to one or more mmWaves. Cell site 414 may also grant UEs 402, 404, 406, and 408 access to other frequency bands. In some aspects, an mmWave relay separate from cell site 414 may receive an analog mmWave signal from cell site 414 for amplification of the analog mmWave signal. Upon amplification, the mmWave relay may transmit the amplified mmWave signal to one or more UEs 402, 404, 406, and 408.

System 400 also includes controller 430, which is configured to communicate information (e.g., control signal information) over system 400. Controller 430 can be a standalone computing device, computing system, or network component, for example. Controller 430 can communicate with cell site 414 via a wired or wireless backhaul link, or through an indirect connection (e.g., a computer network or communication network). In some embodiments, controller 430 can include a mobility management entity; a serving gateway; a public data network gateway; a Home Subscriber Server; a Policy Control and Charging Rules Function; an authentication, authorization, and accounting node; a rights management server, a subscriber provisioning server, a policy server, etc. Controller 430 may communicate with system 400 via one or more of a radio frequency, microwave, infrared, mmWave, and other similar signal.

In embodiments, UE 402 is in communication with an mmWave node of cell site 414 via mmWave 482. Continuing the example, access point 416 is also in communication with cell site 414 via Wi-Fi signal 486. Upon a determination that a fading measurement corresponding to an mmWave transmitted by cell site 414 is above a threshold, controller 430 redirects control signal 484 from UE 402, through access point 416, and to the mmWave node of cell site 414. In embodiments, the control signal 484 is redirected after a determination that a strength of the Wi-Fi signal satisfies a second threshold. Upon redirection of the control signal 484, UE 402 maintains a dual connection with both the Wi-Fi access point 416 (via the control signal 484) and the mmWave node of cell site 414 (via the mmWave 482). As such, UE 402 transmits data through the Wi-Fi access point 416 and to the mmWave node of cell site 414 via control signal 484.

Figure 5:
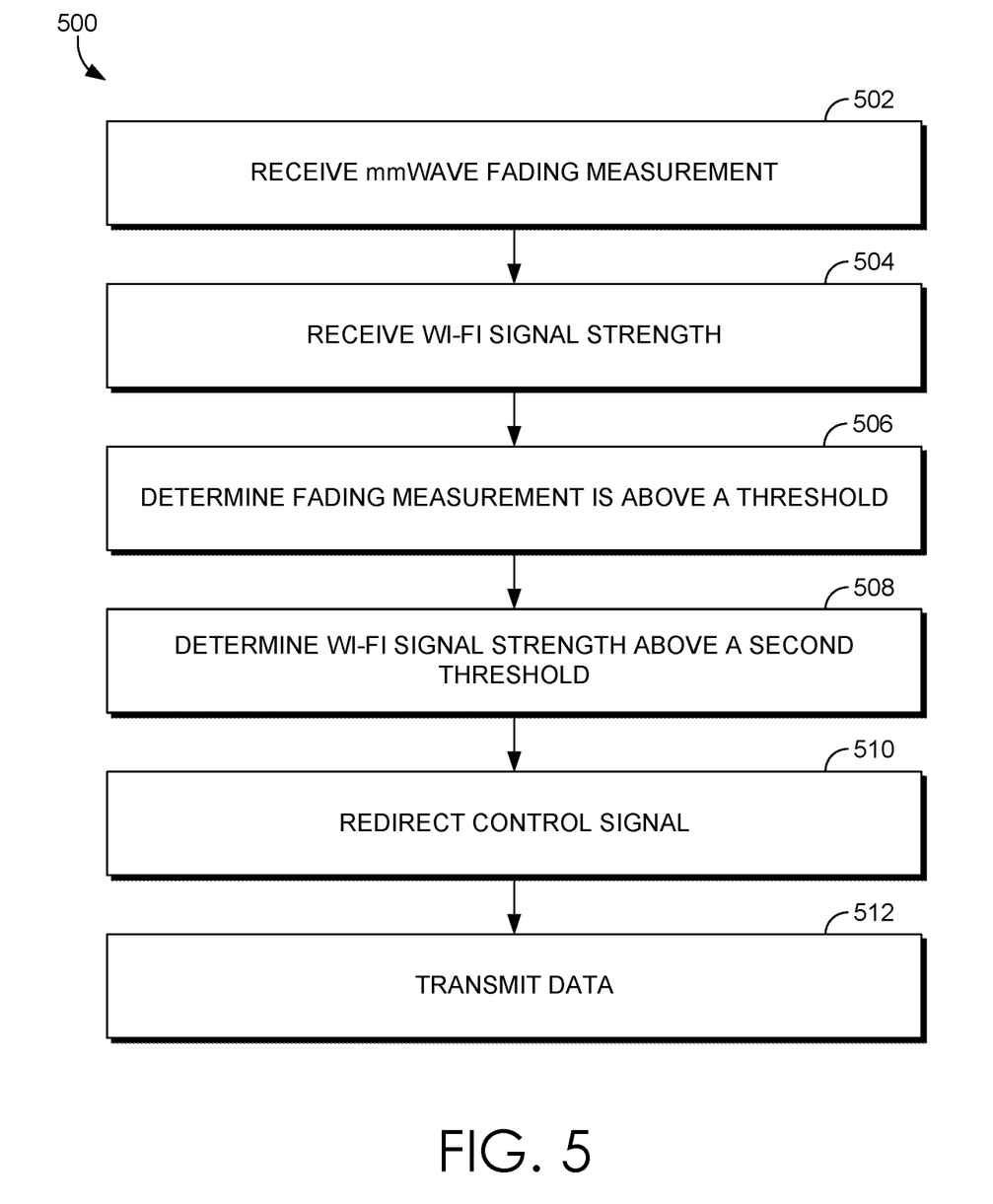
FIG. 5 depicts a flow diagram of one embodiment of the present disclosure.

Turning now to FIG. 5, flow diagram 500 comprises block 502, which includes receiving a fading measurement corresponding to an mmWave detected by a user device. The fading measurement may comprise an average fade duration over a period of time. In some embodiments, the fading measurement was detected by a threshold number of user devices in communication with an mmWave node. In aspects, the fading measurement was detected by the threshold number of user devices over a predetermined period of time. Further, the fading measurement may have been determined based on an RSRP value for the period of time.

At block 504, a Wi-Fi signal is received. For example, a strength of the Wi-Fi signal was received from the user device. Additionally, at block 506, the fading measurement is determined to be above a threshold. In some embodiments, the threshold is determined based on an RSRP value received by the user device. In aspects, the threshold is further determined based on a second RSRP value received by a second user device and a maximum input power of the user device and the second user device. Further, the threshold may further be determined based on RSRP fluctuation measurements received from the user device or a plurality of user devices over a period of time. In other aspects, the threshold may be determined based on a plurality of RSRP values received from a plurality of user devices.

Turning to block 508, it is determined that the Wi-Fi signal strength is above a second threshold. Subsequently, at block 510, a control signal of the user device is redirected via the Wi-Fi signal through a Wi-Fi access point and to the mmWave node. As such, the user device maintains a dual connection with the Wi-Fi access point via the control signal and the mmWave node via the mmWave. Furthermore, at block 512, data from the user device is transmitted through the Wi-Fi access point via the Wi-Fi signal and to the mmWave node.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. An mmWave system for signal offloading corresponding to a millimeter wave (mmWave) node, the system comprising:
one or more mmWave nodes, each of the one or more mmWave nodes configured to wirelessly communicate with a user device in a geographic service area;
a Wi-Fi access point configured to wirelessly communicate with the user device in the geographic service area; and
one or more processors configured to perform operations comprising:
determining that loading or fading of the one or more mmWave nodes providing telecommunication services to the user device is above a threshold, the user device being within a range of the Wi-Fi access point;
in response to the loading or fading being above the threshold, redirecting a control signal of the user device through the Wi-Fi access point to the one or more mmWave nodes, wherein the user device maintains a dual connection with the Wi-Fi access point via the control signal and the one or more mmWave nodes via the an mmWave signal; and
transmitting data, via the Wi-Fi access point, received from the user device to the one or more mmWave nodes.

2. The system of claim 1, wherein the loading of the one or more mmWave nodes is determined to be above the threshold based on processor load measurements of the one or more mmWave nodes, an amount of backhaul link traffic of a wireless backhaul link that transmits data between the user device and the one or more mmWave nodes, and an anticipated backhaul link traffic of the wireless backhaul link.

3. The system of claim 1, wherein the fading of the one or more mmWave nodes is determined to be above the threshold based on an angular spread, polarization, and amplitude associated with the user device and the one or more mmWave nodes, and a distance between the one or more mmWave nodes and the user device.

4. The system of claim 1, further comprising:
prior to redirecting the control signal, determining that the user device is receiving a signal from the Wi-Fi access point;
determining the signal from the Wi-Fi access point has a signal strength above a second threshold, the second threshold corresponding to a capability of a network adapter and one or more antennas of the Wi-Fi access point; and
based on the signal strength being above the second threshold, redirecting the control signal from the Wi-Fi access point in response to the signal strength being above the second threshold.

5. The system of claim 1, wherein the fading of the one or more mmWave nodes is determined to be above the threshold based on indoor fading measurements from the user device, a length of duration for each of the indoor fading measurements, a direction of maximum fading associated with the indoor fading measurements, and an average fade duration for each of the indoor fading measurements.

6. The system of claim 1, further comprising determining the threshold based on heat signature information of the one or more mmWave nodes.

7. The system of claim 1, wherein the threshold is determined based on a location of the user device relative to the one or more mmWave nodes.

8. One or more non-transitory computer-readable media having computer-executable instructions embodied thereon that, when executed, perform a method for signal offloading corresponding to a millimeter wave (mmWave) node, the method comprising:
- detecting, via a user device, a Wi-Fi signal strength for a Wi-Fi access point;
- transmitting, via the user device, a fading measurement corresponding to an mmWave signal from the mmWave node, the mmWave signal detected by the user device; and
- in response to transmitting the fading measurement and detecting the Wi-Fi signal strength, transmitting data from the user device via the Wi-Fi access point and to the mmWave node, wherein the transmission via the Wi-Fi access point and to the mmWave node is based on a redirected control signal, wherein the user device maintains a dual connection with the Wi-Fi access point via the redirected control signal and the mmWave node, and wherein the control signal is redirected based on the fading measurement being above a threshold.

9. The media of claim 8, wherein the control signal is redirected based on the Wi-Fi signal strength satisfying a second threshold.

10. The media of claim 8, wherein the user device transmits a plurality of fading measurements that include first-order fading statistics and second-order fading statistics, and wherein the control signal is redirected based on at least one of the first-order fading statistics being above the threshold and at least one of the second-order fading statistics being above a second threshold.

11. The media of claim 8, wherein the threshold for the fading measurement is based on an available electrical power overhead of the user device relative to other user devices within a threshold distance of the user device.

12. The media of claim 8, wherein the fading measurement is based on a fast fading distribution change.

13. The media of claim 8, wherein the fading measurement is based on one or more of a coherence distance, a spatial auto-covariance, and a Doppler frequency.

14. A method for signal offloading corresponding to a millimeter wave (mmWave) node, the method comprising:
- determining that loading or fading for an mmWave signal transmitted from the mmWave node is above a threshold, wherein the threshold is based on loading or fading measurements from user devices receiving the mmWave signal from the mmWave node;
- determining a user device receiving the mmWave signal from the mmWave node is located within a range of a Wi-Fi access point;
- in response to the loading or fading for the mmWave signal is above the threshold and determining the user device receiving the mmWave signal is located within the range of the Wi-Fi access point:
  - redirecting a control signal of the user device through the Wi-Fi access point to the mmWave node, wherein the user device maintains a dual connection with the Wi-Fi access point via the control signal and the mmWave node; and
- transmitting data, via the Wi-Fi access point, received from the user device to the mmWave node.

15. The method of claim 14, wherein the fading of the mmWave node is determined to be above the threshold based on polarization and amplitude associated with the mmWave signal and the mmWave node.

16. The method of claim 14, wherein the loading of the mmWave node is determined to be above the threshold based on processor load measurements of the mmWave node and an amount of backhaul link traffic of a backhaul link that transmits data between the user device and the mmWave node.

17. The method of claim 14, wherein the loading of the mmWave node is determined to be above the threshold based on payload size associated with an uplink transmission from the user device to the mmWave node and a signal-to-noise ratio.

18. The method of claim 14, wherein the fading of the mmWave node is determined to be above the threshold based on an average fade duration for plurality of fading measurements received from the user device and other user devices receiving the mmWave signal from the mmWave node during a period of time.

19. The method of claim 14, wherein the fading of the mmWave node is determined to be above the threshold based on a plurality of fading measurements received from the user device that include large-scale fading coefficients and small-scale fading coefficients, and wherein the control signal is redirected based on at least one of the large-scale fading coefficients being above the threshold and at least one of the small-scale fading coefficients being above a second threshold.

20. The method of claim 14, wherein the fading of the mmWave node is determined to be above the threshold based on indoor fading measurements and outdoor fading measurements received from the user device and other user devices receiving the mmWave signal from the mmWave node.

* * * * *